Patented June 3, 1952

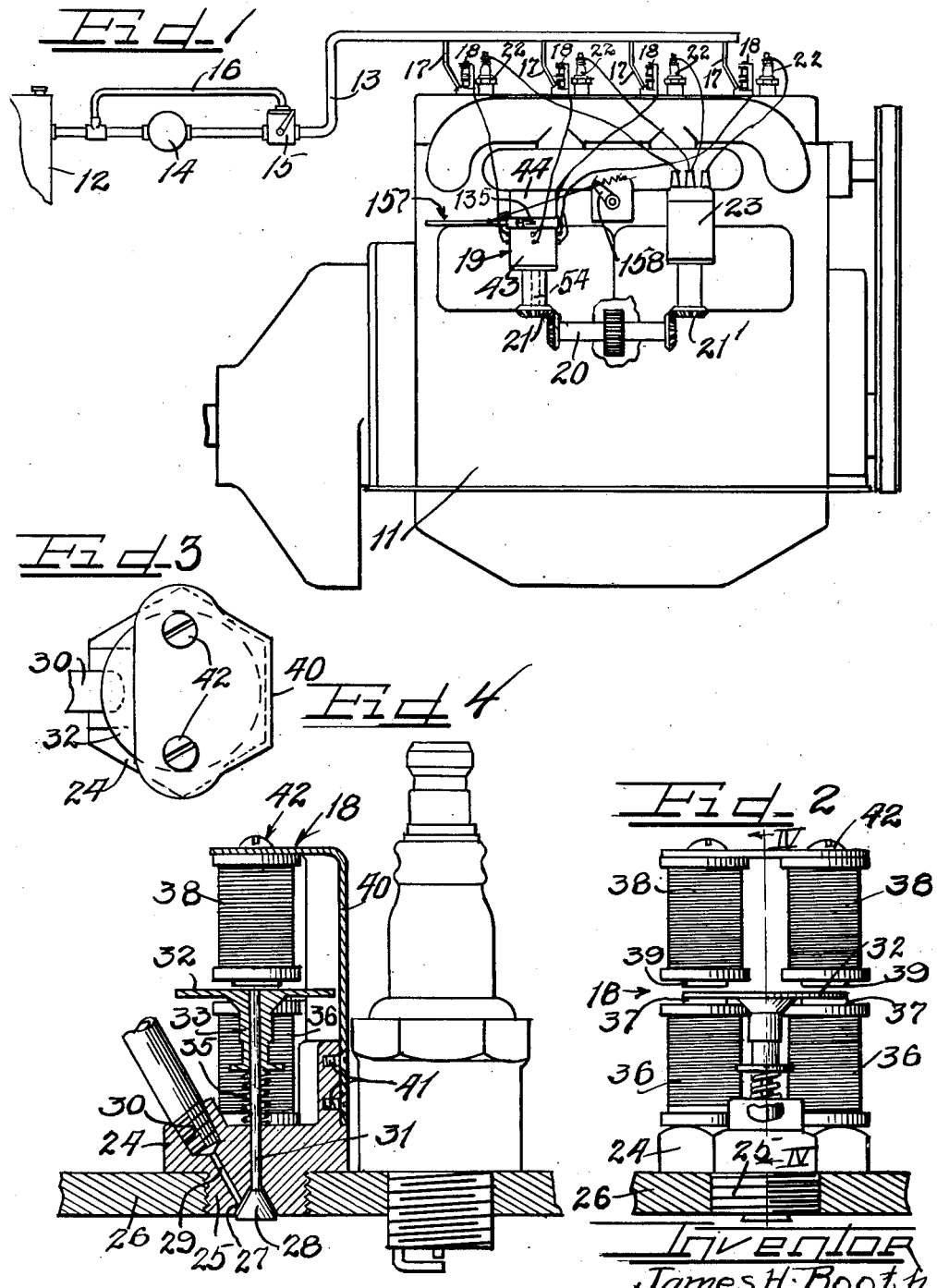

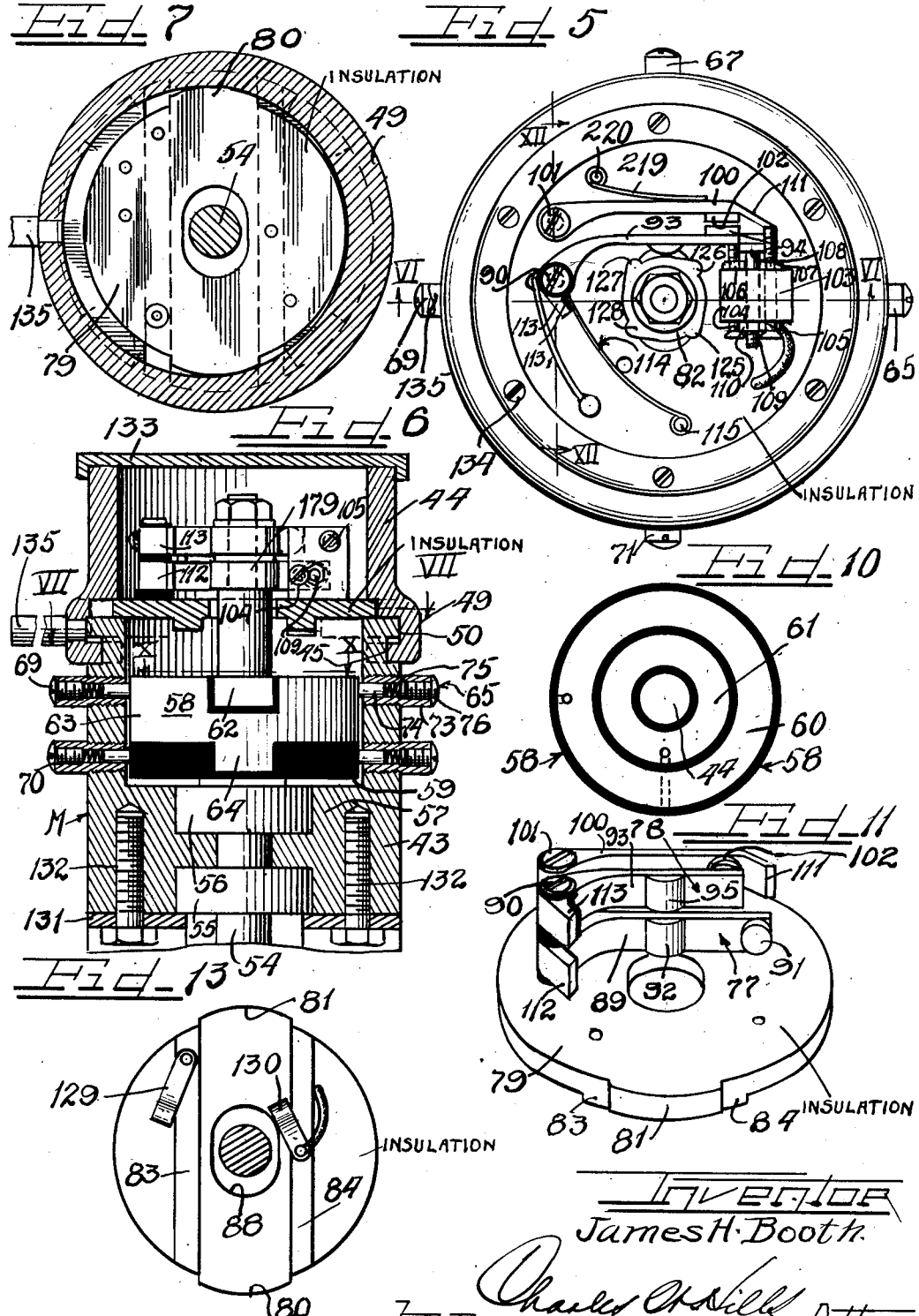

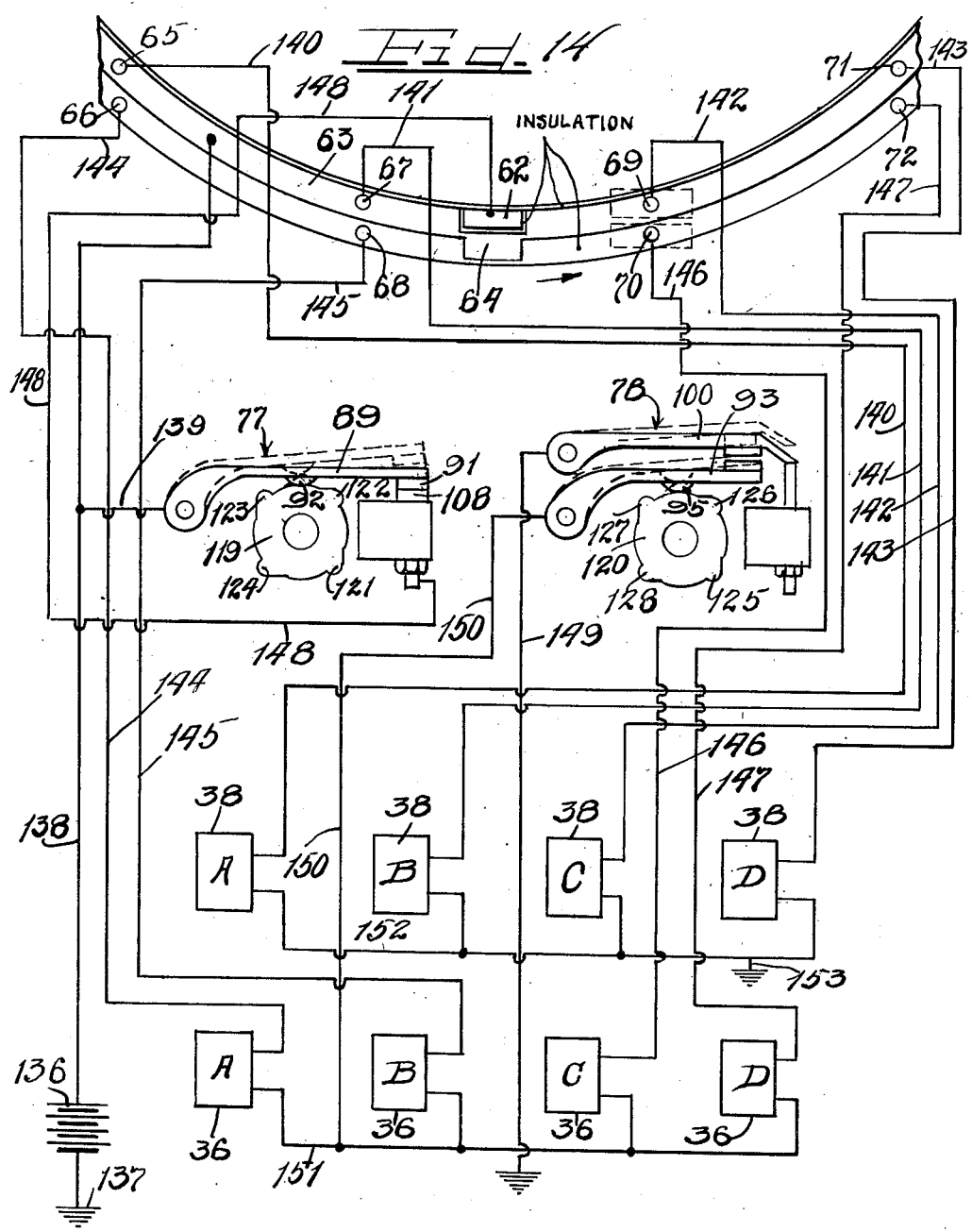

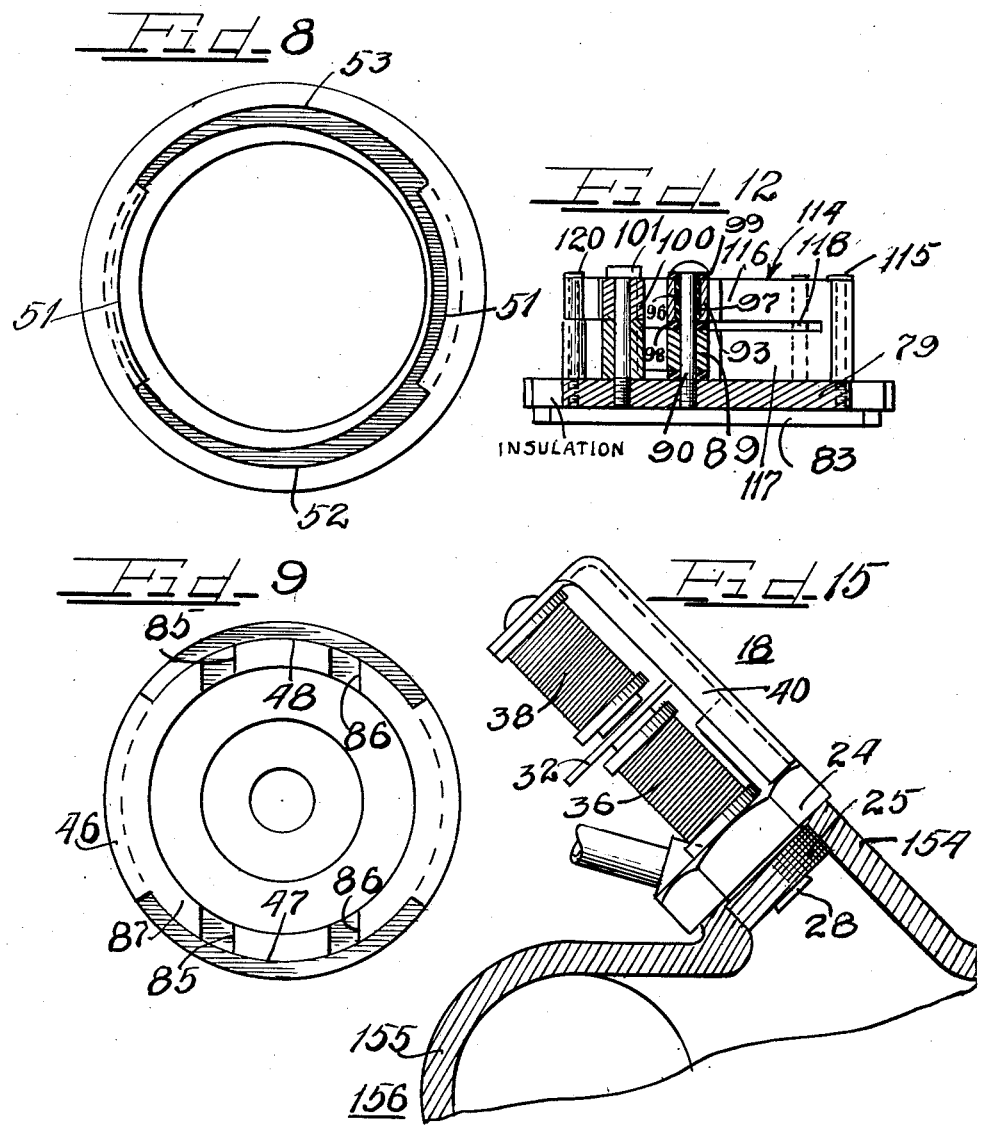

2,598,754

UNITED STATES PATENT OFFICE 2,598,754

FUEL INJECTION SYSTEM

James H. Booth, Detroit, Mich., assignor to Thompson Products, Inc., a corporation of Ohio Application January 31, 1944, Serial No. 520,563

13 Claims. (Cl. 137—144)

This invention relates to a fuel injection system and more particularly to a novel injector valve arrangement and control system for opening and closing the valve.

Many arrangements have been devised for metering and feeding fuel into the cylinders of an internal combustion engine. The most widely used form of combustion engine at the present time is one employing a carburetor for vaporizing and mixing the fuel with air to obtain a combustible mixture which in turn is fed to the engine cylinders. A type of system was devised some time ago which eliminated the need for a carburetor and is known as a fuel injection system. In such a system a metered quantity of liquid fuel under pressure is fed directly or through an intake manifold to each cylinder of the engine. Air is mixed with this metered quantity of fuel in the cylinder itself. This type of system would have many advantages over the carburetor type of system if reliable and efficient means is provided for metering and feeding the fuel into the cylinder.

It is an object of the present invention to provide a novel fuel injection type system for an internal combustion engine.

It is a further object of the present invention to provide a novel control system for operating the valves of a fuel injection system.

Another object of the present invention is to provide novel means for metering fuel into the cylinders or into the intake manifold of an internal combustion engine.

Another and further object of the present invention is to provide a novel method and means for controlling the fuel feeding of an internal combustion engine.

The novel features which I believe to be characteristic of my invention are set forth with particularity in the appended claims. My invention itself, however, both as to its manner of construction and method of control, together with further objects and advantages, may best be understood by reference to the following description, taken in connection with the accompanying drawings, in which:

Figure 1 is a diagrammatic illustration of an internal combustion engine employing a fuel injection system of the type in which fuel is metered directly into each cylinder, and which embodies certain of the novel features of the present invention;

Figure 2 is an elevational view of a valve assembly unit for one of the cylinders of the internal combustion engine of Figure 1;

Figure 3 is a top view of a valve assembly shown in Figure 2;

Figure 4 is a sectional view of the valve assembly unit taken along the line IV—IV of Figure 2;

Figure 5 is a top view of the timer employed for controlling the operation of the fuel injection valve;

Figure 6 is an elevational view partly in section of the interior of the timer as taken along the line VI—VI of Figure 5;

Figure 7 is a sectional view of the timer taken along the line VII—VII of Figure 6;

Figure 8 is a bottom plan view of the top cylindrical housing member;

Figure 9 is a top plan view of the bottom cylindrical housing member;

Figure 10 is a top plan view of the slip ring and commutator block as viewed along the section line X—X of Figure 6;

Figure 11 is an isometric view of the switch block with certain portions thereof removed to show more clearly the movable arms mounted on the block;

Figure 12 is a sectional view of the switch block as taken along the line XII—XII of Figure 5;

Figure 13 is a bottom plan view of the switch block showing the distributor contact fingers;

Figure 14 is a wiring diagram illustrating the control circuit for operating the fuel injection valve; and Figure 15 is an elevational view partly in section of a modified form of the present invention wherein the fuel injection valve is mounted on the intake manifold of the engine.

Referring first to Figure 1, there is illustrated therein an internal combustion engine 11 employing a fuel injection system embodying the novel teachings of the present invention. Fuel is fed to the engine 11 from a fuel tank 12 through a fuel line 13, there being a fuel pump 14 and a controlled pressure by-pass device 15 interposed in the fuel line, as indicated. The by-pass device 15 operates to maintain a controlled pressure in the fuel line 13 of the fuel being delivered to the engine. A portion of the fuel is fed back through a by-pass line 16 from the by-pass device 15 in order to maintain the controlled fluid pressure in the fuel line 13.

In the first embodiment of the invention to be described the fuel injection valves (presently to be described) are arranged to pass fuel directly into each cylinder.

The particular internal combustion engine shown in Figure 1 is a four-cylinder engine and hence four fuel intake lines 17 branch off from the main fuel line 13 to the four cylinders of the engine 11.

Each cylinder of the engine 11 is provided with a fuel injection valve assembly 18 which will presently be described in detail. The valve assemblies 18 are arranged to be electrically operated from a timer unit 19 which is driven from the timer drive-shaft 20 through the gearing generally indicated at 21.

Each cylinder of the engine 11 is also provided with a sparkplug 22 which is electrically energized from a conventional type of distributor 23 which is also driven from the timer shaft 20 through the gearing 21'.

A simplified illustration of one of the valve assembly units 18 is shown in Figures 2, 3 and 4 of the drawings. More particularly, the valve assembly 18 shows a base 24 having a threaded shank or head 25 which is threaded in the first illustrated form of the invention into the top wall 26 of the cylinder with which it is associated. The head 25 has a tapered recess 27 which provides a valve seat for the valve 28. Opening into the recessed portion 27 is a metering orifice 29 which communicates with a threaded socket 30 which receives the end of one of the branch fuel lines 17. The valve 28 is mounted on a valve stem 31 which passes up through the base 24 and which is provided at its upper end with an armature member 32, the armature member 32 having a tail or shank portion 33 which is rigidly secured to the upper end of the valve stem 31. A biasing spring 35 normally urges the armature member 32 and the valve 28 upwardly thereby to maintain the valve 28 in a closed position when the electrical system is deenergized.

The valve assembly unit 18 is provided with a lower pair of solenoids 36 having soft iron cores 37. The valve assembly 18 is also provided with an upper set of solenoids 38 which are provided with soft iron cores 39. The coils 36 and the coils 38 are disposed on opposite sides of the armature 32 and are positioned in such a manner that the armature 32 is seated on the core members 37 when the coils 36 are energized, and is almost seated on the core members 39 when the coils 38 are energized, the upward limit of movement of the armature being determined by the seating of the valve 28 on the valve seat 27. The coils or solenoids 36 are directly carried on the base 24 while the coils 38 are mounted on a bracket 40. The bracket 40 is mounted on the base 24 and secured thereto by any suitable means such as by bolts 41. The coils 38 are secured to the upper end of the bracket 40 in any suitable manner such as by bolts 42.

The sparkplug 22 previously referred to is mounted in the top cylinder wall 26 (as shown in Figure 4).

Fuel is admitted to a cylinder through a fuel injection valve unit 18 upon energization of the lower solenoids 36 and deenergization of the upper solenoids 38. The admission of fuel to the cylinder is stopped upon energization of the upper solenoids 38 and deenergization of the lower solenoids 36. As is necessary in any conventional internal combustion engine, means must be provided for determining the amount of fuel admitted and the relative time at which it is admitted in each cycle of operation. The timer 19 provides this control for the particular type of system herein described.

The novel timer mechanism illustrated in Figures 5 to 13 of the drawings is mounted in a pair of interlocking cylindrical housing members 43 and 44. The upper end of the lowering housing member 43 is provided with a radially outwardly opening channel 45, the upper lip 46 of which is cut away on diametrically opposite sides over a substantial arcuate portion as at 47 and 48 (Figure 9). The somewhat enlarged lower end 49 of the upper housing member 44 is provided with a radially inwardly opening channel 50, the lower wall or lip 51 of which is cut away on diametrically opposite sides over a substantial arcuate portion as at 52 and 53. The cutaway portions 47, 48, 52 and 53 are sufficiently extensive that the lips 51 may be moved axially into the channel 45 and then the upper housing member 44 turned until the lips 51 are interlocked under the lips 46. The arcuate length of the lips 46 and 51 is sufficiently extensive that limited relative angular movement may be had between the housing members 43 and 44 without the lips becoming disengaged.

A timer shaft 54 extends up through the bottom of the housing 43 and is journaled in two bearing members 55 and 56, which are mounted in the base wall 57 of the housing 43. Shaft 54 is driven from the main timer shaft 20 of the engine through gearing 21, as previously referred to in Figure 1.

A commutator 58 is mounted on shaft 54 for rotation therewith immediately above the base wall 57 of housing 43. Commutator 58 includes a cylindrical block of insulating material 59; in the upper surface of which are embedded two concentric conducting rings 60 and 61, and in the cylindrical surface of which are embedded a short arcuate conducting segment 62 and a complete conducting ring 63. Conducting ring 63 includes an offset portion 64 directly opposite segment 62.

Symmetrically mounted in the lower housing 43 around the commutator 58 are eight brush assemblies 65, 66, 67, 68, 69, 70, 71 and 72 arranged in pairs (the number of pairs being the same as the number of engine cylinders). Each brush assembly includes a brass sleeve 73, a carbon brush 74, a spring 75 and a bolt 76, as is indicated by the specific application of reference numerals to the brush assembly 65 shown in Figure 6. The inner end of the sleeve 73 is threaded into an opening in the wall of housing 43, while the outer end acts as a terminal post and is internally threaded near its outer end to receive bolt 76.

The upper brush assemblies 65, 67, 69 and 71 of the respective brush pairs are located opposite the upper end of the cylindrical surface of the commutator 58 and hence are disposed in the path of movement of the conducting segment 62 and the main body portion of conducting ring 63. The gaps between the ends of the conducting segment 62 and the confronting portions of the ring 63 are sufficiently small that the brush 74 of each upper brush assembly will bridge the gap as the ring 63 moves out of engagement therewith, and as the conducting segment 62 moves into engagement therewith.

The lower brush assemblies 66, 68, 70 and 72 are located in the path of movement of the offset portion 64 of the conducting ring 63. Thus offset portion 64 is arranged to be engaged successively and at spaced intervals by first one lower brush assembly and then another, and this period of engagement will coincide with the engagement of the conducting segment 62 by the upper brush assembly of the same pair.

The timer 19 is also provided with a pair of cam operated switches 77 and 78; the former being a normally closed switch and the latter being a normally opened switch. These two switches are mounted on a plate 79 which is generally circular in shape but which is provided with two portions 80, 81 which project slightly as shown in Figures 7, 11 and 13. Plate 79 is seated on the upper end of housing 43. The lower interior portion of housing 44 is recessed to provide an annular shoulder 82 which is eccentrically disposed with respect to the central axis of the housings 43 and 44. The inner diameter of the annular shoulder 82 is substantially the same or slightly greater than the distance across the disk 79 where the lips 80 and 81 are located.

The disk 79 is prevented from rotating by providing a pair of ribs 83 and 84 on the under surface thereof which fit into channels 85 and 86 formed in the upper edge 87 of the lower housing 43. The disk 79 is also provided with an oblong center opening 88 through which the shaft 54 extends. The major axis of the oblong center opening 88 is parallel to the ribs 83 and 84.

Due to the eccentricity of the shoulder 82 and due to the fact that the lips 80 and 81 of the disk 79 lie against this shoulder 82, it will be apparent that limited movement of the disk 79 may be had with respect to the shaft 54, it being remembered that the ribs 83 and 84 in conjunction with the channels 85 and 86, confine movement of the disk 79 to a single path.

The two cam operated switches 77 and 78 which are mounted on the disk 79 will now be described. As previously mentioned, the switch 77 is a normally closed switch and includes a movable contact arm 89 which is mounted for limited angular movement on a pin 90. The outer free end of the movable contact arm 89 includes a contact button 91 on an intermediate portion of the arm 89 and substantially opposite the opening 88 in the disk 79 is secured a raised portion or button 92 of fiber or other insulating material which provides a cam follower. A second movable contact arm 93 is mounted on the same pin 90 above the movable contact arm 89. This second movable contact arm 93 is somewhat shorter than movable contact arm 89 and is provided with a contact button 94 on the side of the arm away from the hole 88 on the disk 79. This movable arm 93 does, however, have a raised portion or button 95 which is similar to raised portion 92 on arm 89.

Since the movable contact arm 93 must be electrically insulated from the movable contact arm 89 an insulating bushing 96 is provided around the shank of the pin 90 in the opening 97 through which the pin 90 passes (see Figure 12). Insulating washers 98 and 99 are also provided at opposite ends of the bushing 96 to complete the insulation of the arm 93 from the pin 90.

A third movable contact arm 100 is mounted on a second pin or post 101 behind the movable contact arm 93. It is to be understood that this movable contact arm 100 lies in the same plane of movement as the plane of movement of the contact arm 93 and is provided with a contact button 102 which is arranged to be engaged by the contact button 94 on the arm 93.

A stationary block 103 is mounted on the disk 79 on the opposite side of the hole 88 from the pin or post 90. This block 103 carries two adjustable stop members 104 and 105 which are provided respectively with lock nuts 106 and 107. It is also provided with an adjustable stationary contact 108 having a threaded shank 109 which extends through the block 103 and which is provided on the under side of the block 103 with a lock nut 110. Stationary contact 108 is arranged to be engaged by the contact button 91 on the movable contact arm 89. The adjustable stop 104 limits the clockwise movement of the movable contact arm 93 about the pin or post 90. The adjustable stop 105 is arranged to be engaged by the projecting or bent tip portion 111 of the movable contact arm 100 and is thus arranged to limit the clockwise movement of the movable contact arm 100 about the post 101.

Each of the arms 89 and 93 is provided with tail portions 112 and 113 respectively which are engaged by a leaf spring 114 mounted on a post 115 and having a pair of fingers 116 and 117 which extend around a fixed post 118 and engage the tail portions 112 and 113 respectively of the movable arm 89 and 93. These leaf spring portions 116 and 117 tend to move the arms 89 and 93 in a clockwise direction about their post 90, and it will thus be understood that these two arms are normally biased against the stationary contact 108 and the adjustable stop 104 respectively. A leaf spring 219 is rigidly mounted on a post 220 and is sprung in such a manner as to normally urge the movable contact arm 100 against the adjustable stop 105.

The adjustable stops 104 and 105 are so adjusted with respect to each other that the contact button 94 on the movable contact arm 93 is out of engagement with the contact button 102 on the movable contact arm 100. A relatively slight movement of the contact arm 93 in a counter-clockwise direction, however, will cause it to engage the movable contact arm 100 and this engagement will continue even though further movement of the movable contact arm 93 follows. It will thus be understood that the contact arm 100 is in effect merely a yieldable stationary contact.

Two cam disks 119 and 120 are rigidly secured to the shaft 54 in any suitable manner. Cam disk 119 has four raised portions 121, 122, 123 and 124 (see Figure 14). Cam disk 120 has four raised portions similar to those of cam disk 119 and which are identified as 125, 126, 127 and 128 (see Figures 5 and 14). The projecting portions 121 to 124 on cam disk 119 are arranged to engage the cam follower 92 on the movable contact arm 89 and lift the latter off of stationary contact 108 each time that one of the projections 121 to 124 engages the cam follower. The raised portions 125 to 128 on cam disk 120 are arranged to engage the cam follower 95 on the movable contact 93. Each time that one of the raised portions 125 to 128 engages the cam follower 95 the movable contact arm 93 is moved to cause engagement of the same with the contact arm 100.

It will be apparent from the above that the length of time that the normally closed switch 77 remains open and the length of time that the normally open switch 78 remains closed depends upon the shape of the projecting portions on the respective cam disks and on the speed of rotation of the timer shaft 54. It will further be apparent that this length of time may be adjusted slightly by varying the relative position of the switch block 79 with respect to the shaft 54, since this varies the effectiveness of the projecting portions on the cam disks and in effect varies the angular extent on the cam disks over which one of the movable switch arms has been lifted away from its normal position.

A pair of contactor brushes 129 and 130 for continuous sliding engagement with the conducting rings 60 and 61 respectively on the upper surface of the commutator block 58 are conveniently mounted on the ribs 83 and 84 respectively of the switch block 79.

The entire timer unit, as above described, may be conveniently bolted to a supporting bracket 131 on the engine 11 as by a plurality of bolts 132. The upper end of the upper housing 44 is also preferably closed off by a cover plate 133 which is screwed to the upper end of the housing 44 by suitable bolts 134.

Any mechanical means may be provided for varying the angular position of the upper housing member 44 with respect to the lower housing member 43 to thereby vary the eccentricity of the switch plate 79 with respect to the shaft 54, and for purposes of illustration a mechanical lever 135 has been shown in Figures 6 and 7 as suggested.

The energization circuit for the valve assemblies 18 is shown in Figure 14. For purposes of convience, the commutator ring 63 has been developed so as to show all of the brush assemblies 65 to 72. For purposes of simplicity, the valve operating windings 36 associated with one cylinder have been diagrammatically indicated as A, while those associated with the remaining cylinders have been indicated as B, C and D respectively. Similarly, the operating solenoids 38 of the valve assemblies 18 have been further identified with the letters A, B, C and D to represent the four cylinders of the engine with which they are associated.

Energy for operating various solenoids 36 and 38 is obtained from any suitable source of electromotive force, such, for example, as a six-volt battery 136. The negative side of the battery 136 is grounded as at 137 while the positive side of the battery is connected through a conductor 138 to the commutator ring 63. The particular manner in which the conductor 138 is connected to the commutator ring 63 is to connect conductor 138 to brush 129 which in turn engages conducting ring 60. This ring 60 is connected through the interior of the block 59 to commutator ring 63. The positive side of the battery 136 is also connected through conductor 138 and a branch conductor 139 to the movable contact arm 89 of the switch 77.

The upper brush assemblies 65, 67, 69 and 71 are connected through conductors 140, 141, 142 and 143 to the upper valve assembly coils 38 of the cylinders A, B, C and D respectively. Similarly, the lower brush assemblies 66, 68, 70 and 72 are connected through conductors 144, 145, 146 and 147 respectively, to the lower valve assembly coils 36 of the cylinders A, B, C and D respectively. The stationary contact 108 of the switch 77 is connected to the conducting segment 62 through conductor 148. The contact arm 100 of the switch 78 is grounded through a conductor 149. The movable contact arm 93 of the switch 78 is connected through a conductor 150 and a common bus 151 to the other end of each of the lower valve assembly coils 36 of the cylinders A, B, C and D respectively. The ends of the upper valve assembly coils 38 which are not connected to the brush assemblies 65, 67, 69 and 71 are connected together by a common bus 152, which in turn is grounded as at 153.

From a consideration and inspection of Figure 14, it will be apparent that the fuel injection valve 28 of a cylinder is opened and closed during the time that the offset portion 64 of the commutator ring 63 and the conducting segment 62 are in engagement with one of the pairs of brush assemblies 65 to 72. Which cylinder is having its fuel injection valve 28 opened will depend upon which pair of brush assemblies 65 to 72 is in engagement with the offset portion 64 and the conducting segment 62 at the time. Let it be assumed, for example, that the conducting ring 63 is being moved in the direction indicated by the arrow in Figure 14. As shown by the the full lines in Figure 14, all of the upper contacting brushes 65, 67, 69 and 71 are in engagement with the main body portion of the commutator ring 63. Under such a circumstance, all of the upper valve assembly coils 38 of the cylinders A, B, C and D are energized. Furthermore, since none of the lower contacting brushes 66, 68, 70 and 72 are in engagement with the offset portion 64 of the commutator ring 63, it is apparent that the lower valve assembly coils 36 of the cylinders A, B, C and D are all deenergized. Hence, in the position as shown by the full lines in Figure 14, all of the fuel injection valves 28 are closed. As the rotation of the disk 59 continues and carries the commutator ring 63 in the direction indicated by the arrow, the brushes 70 and 69 will ride onto the offset portion 64 and the conducting segment 62 respectively. This now places the engine cylinder with which the brush assemblies 69 and 70 are associated under control of the cam operated switches 77 and 78. The valves of the remaining cylinders, namely, cylinders A, B and D, however, remain closed in the manner just previously described.

Due to the fact that brush 70 is now in engagement with the offset portion 64, it will be apparent that the lower valve assembly coils 36 of the cylinder C will be energized through the cam operated switch 78 as soon as the movable contact arm 93 thereof is moved into engagement with the yieldable contact arm 100. The electrical circuit for this energization circuit extends from the battery 136 through conductor 138, commutator ring 63, brush 70, conductor 146, coils 36 of cylinder C, conductor 151, conductor 150, movable contact arm 93, yieldable contact arm 100 and conductor 149 to ground.

The energization of the upper valve assembly coils 38 of cylinder C is under control of the cam operated switch 77. These coils 38 of cylinder C remain energized only so long as the movable contact arm 89 of switch 77 remains in engagement with the stationary contact 108. The reason for this is that the energization of the upper valve assembly coils 38 of the cylinder C is transferred from the commutator ring 63 and is now made through the switch 77 and the conducting segment 62. More particularly, the upper valve assembly coils 38 of cylinder C remain energized while the switch 77 is closed through conductors 138 and 139, switch 77, conductor 148, conducting segment 62, brush 69, conductor 142, coils 38 of cylinder C, and conductor 152 to ground 153. As soon as the movable contact arm 89 is lifted off of the stationary contact 108, however, this energization circuit is broken and the upper valve assembly coils 38 of cylinder C become deenergized.

In the embodiment of the invention just described the movable contact arm 93 is arranged to close simultaneously with the opening of the movable contact arm 89. Likewise, the movable contact arm 93 is arranged to open simultaneously with the closing of the movable contact arm 93. The length of time which the movable contact arm 93 remains closed and the movable contact arm 89 remains open determines the length of time which the fuel injection valve 28 remains open. As previously explained, the shape of the raised portions 121 to 124 on the cam 119 and the raised portions 125 to 128 on the cam 120, enables the length of time which the movable contact 93 remains closed and the movable contact 89 remains open to be determined by the relative position of the axis of the cams 119 and 120 with respect to the block 103 which carries the stop members 104 and 105 and the contact 108.

As the disk 59 continues to rotate, the offset portion 64 and the conducting segment 62 will successively engage the brushes 72 and 71, then the brushes 66 and 65 and finally the brushes 68 and 67, which completes one revolution of the disk 59. It should be understood that the initial engagement of the offset portion 64 and the conducting segment 62 with one pair of brushes does not, of itself, cause an opening of a fuel injection valve 28, but rather merely places the fuel injection valve of the cylinder with which that particular pair of contacts is associated, under control of the cam operated switches 77 and 78. The operation of the switches 77 and 78 will take place over an intermediate part of the offset portion 64 and the conducting segment 62.

The operating cycle of an internal combustion engine of the fuel injection type is so well known that a detailed explanation of the same is not deemed necessary at this time. It may be said, however, that the time at which fuel is injected into the cylinder may vary widely and may even overlap other operating functions of the full cycle of operations.

The means for introducing air into the cylinders is conventional, as is the particular structure of the distributor which fires the various sparkplugs.

In Figure 15 of the drawings I have illustrated a modification of the present invention. In the first embodiment of the invention, which was described with reference to Figures 1 to 14, the fuel injection valve was shown as being directly mounted in a wall of the engine cylinder. The novel features of the present invention may also be embodied in a fuel injection system in which the fuel injector valve is mounted in the intake manifold of the engine.

In Figure 15 the fuel injection valve unit 18 is shown mounted in a boss 154 which is preferably formed as an integral part of the wall 155 of the intake manifold which is generally characterized by the numeral 156.

Air is taken into the intake manifold 156 in any suitable and convenient manner and is caused to pass the various cylinders of the engine 11 (Figure 1).

Fuel is injected into the air stream as the air passes below the valve assembly unit 18. Under some circumstances, it has been found that a more efficient mixture of gas and air may be had if the axis of the valve movement is inclined so as to make an acute angle with the direction from which the air is coming. This is clearly shown in Figure 15.

In either form of the invention provision is preferably made for mechaniscally adjusting the size of the air intake opening into the intake manifold 156 simultaneously with adjustment of the relative position of the switch block 79 with respect to the timer shaft 54, through the mechanical operating member 135. Such a mechanical linkage system, which may be of any conventional type, is suggested by the diagrammatic illustration thereof identified by the reference numeral 157 in Figure 1. It will be sufficient for an understanding of the present invention that upon actuation of the mechanical linkage system 157 the air intake valve of the intake manifold, which is controlled through an adjustable lever 158, has its position changed simultaneously with any change in the position of the upper housing member 44 through actuation of its position controlling lever 135.

While I have shown a particular embodiment of my invention it will, of course, be understood that I do not wish to be limited thereto, since many modifications may be made, and I therefore contemplate, by the appended claims, to cover all such modifications as fall within the true spirit and scope of my invention.

I claim as my invention:

1. An electrical control circuit including a first series of electrical elements, a second series of electrical elements corresponding in number to said first series, a group of contacts corresponding in number to the elements of said first series and connected to the respective elements thereof, a group of contacts corresponding in number to the elements of said second series and connected to the respective elements thereof, a timer including a member having a surface of revolution, a commutator bar on said surface of revolution including a main body portion arranged to engage said first group of contacts and an offset portion on said surface arranged to engage first one and then another contact of said second group of contacts, a conducting segment on said surface opposite said offset portion and in line with said main body portion of said bar, said segment being insulated from said bar, a source of electric energy having one side connected to said bar and a second side connected to all of said elements of said first series on the opposite side thereof from their respective connections to the contacts of said first group, the side of said source connected to said bar being also connected to a circuit interrupter which in turn is connected to said segment, the side of said source connected to said first group of elements being also connected to a circuit closing element which in turn is connected to all of the elements of said second series, and cycling means for opening said interrupter for a predetermined period of time each time one of said contacts of said first groups is in engagement with said conducting segment and for closing said circuit closing element for a predetermined period of time each time one of the contacts of said second group is in engagement with said offset portion.

2. An electrical control circuit including a first series of electrical elements, a second series of electrical elements corresponding in number to said first series, a group of contacts corresponding in number to the elements of said first series and connected to the respective elements thereof, a group of contacts corresponding in number to the elements of said second series and connected to the respective elements thereof, a timer including a member having a surface of revolution, a commutator bar on said surface of revolution including a main body portion arranged to engage said first group of contacts and an offset portion on said surface arranged to engage first one and then another contact of said second group of contacts, a conducting segment on said surface opposite said offset portion and in line with said main body portion of said bar, said segment being insulated from said bar, a source of electric energy having one side connected to said bar and a second side connected to all of said elements of said first series on the opposite side thereof from their respective connections to the contacts of said first group, the side of said source connected to said bar being also connected to a circuit interrupter which in turn is connected to said segment, the side of said source connected to said first group of elements being also connected to a circuit closing element which in turn is connected to all of the elements of said second series, and cycling means for opening said interrupter for a predetermined period of time each time one of said contacts of said first group is in engagement with said conducting segment and for closing said circuit closing element for a predetermined period of time each time one of the contacts of said second group is in engagement with said offset portion, and means for adjusting the length of the period of time which said circuit interrupter is open and for adjusting the length of time said circuit closing element is closed.

3. An electrical control circuit including a first series of electrical elements, a second series of electrical elements corresponding in number to said first series, a group of contacts corresponding in number of the elements of said first series and connected to the respective elements thereof, a group of contacts corresponding in number to the elements of said second series and connected to the respective elements thereof, a timer including a member having a surface of revolution, a commutator bar on said surface of revolution including a main body portion arranged to engage said first group of contacts and an offset portion on said surface arranged to engage first one and then another contact of said second group of contacts, a conducting segment on said surface opposite said offset portion and in line with said main body portion of said bar, said segment being insulated from said bar, a source of electric energy having one side connected to said bar and a second side connected to all of said elements of said first series on the opposite side thereof from their respective connections to the contacts of said first group, the side of said source connected to said bar being also connected to a circuit interrupter which in turn is connected to said segment, the side of said source connected to said first group of elements being also connected to a circuit closing element which in turn is connected to all of the elements of said second series, and cycling means for opening said interrupter for a predetermined period of time each time one of said contacts of said first group is in engagement with said conducting segment and for closing said circuit closing element for a predetermined period of time each time one of the contacts of said second group is in engagement with said offset portion, said circuit closing element being closed substantially simultaneously with the opening of said circuit interrupter and said circuit closing element being opened thereafter substantially simultaneously with the reclosing of said circuit interrupter.

4. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, said commutator including means for connecting all of said first coils to said first energization circuit and for sequentially and at spaced intervals connecting said first coils to said second energization circuit, said commutator also including means for connecting a selected one of said second coils to said third energization circuit for a period equal to the time the energization of the first coil is interrupted when the first coil associated with the selected second coil is connected to said second energization circuit.

5. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, said commutator including means for connecting all of said first coils to said first energization circuit and for sequentially and at spaced intervals connecting said first coils to said second energization circuit, said commutator also including means for connecting a selected one of said second coils to said third energization when the first coil associated with the selected second coil is connected to said second energization circuit, a cam driven by said timer for opening said interrupter in said second energization circuit at predetermined spaced intervals of time and for maintaining the same open for the time that the second coil is energized.

6. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit for the period of time that the energization of the first coil by the first energizing circuit is interrupted, the particular second coil connected at any given time being the coil which is connected with the same valve as the particular first coil then connected to said second energization circuit.

7. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit, the particular second coil connected at any given time being the coil which is associated with the same valve as the particular first coil then connected to said second energization circuit, a cam member rotated by said timer for opening said circuit interrupter a predetermined period of time each time one of said first coils is connected to said second energization circuit, and a second cam member rotated by said timer for closing said circuit closing means for the same predetermined period of time each time one of said second coils is connected to said third energization circuit.

8. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit, the particular second coil connected at any given time being the coil which is associated with the same valve as the particular first coil then connected to said second energization circuit, a cam member rotated by said timer for opening said circuit interrupter a predetermined period of time each time one of said first coils is connected to said second energization circuit, and a second cam member rotated by said timer for closing said circuit closing means for the same predetermined period of time each time one of said second coils is connected to said third energization circuit, and means for varying the length of the period said circuit interrupter is maintained open and for varying the length of the period said circuit closing means is maintained closed.

9. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit, the particular second coil connected at any given time being the coil which is associated with the same valve as the particular first coil then connected to said second energization circuit, a cam member rotated by said timer for opening said circuit interrupter a predetermined period of time each time one of said first coils is connected to said second energization circuit, and a second cam member rotated by said timer for closing said circuit-closing means for the same predetermined period of time each time one of said second coils is connected to said third energization circuit, the length of the period said circuit interrupter remains closed being less than the length of time a first coil is connected to said second energization circuit.

10. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit, the particular second coil connected at any given time being the coil which is associated with the same valve as the particular first coil then connected to said second energization circuit, a cam member rotated by said timer for opening said circuit interrupter a predetermined period of time each time one of said first coils is connected to said second energization circuit, and a second cam member rotated by said timer for closing said circuit closing means for the same predetermined period of time each time one of said second coils is connected to said third energization circuit, the length of the period said circuit interrupter remains closed being less than the length of time a first coil is connected to said second energization circuit and the length of the period said circuit closing means remains closed being less than the length of time a second coil is connected to said third energization circuit.

11. The combination of a plurality of ports, a plurality of valves for said ports, a coil associated with each of said valves for urging its associated valve to a closed position when energized, a second coil associated with each of said valves for urging its associated valve to an opened position when energized, a timer, a commutator driven by said timer, an energization circuit for said first coils, a second energization circuit for said first coils having a circuit interrupter therein, a third energization circuit for said second coils, having normally open, circuit closing means therein, said commutator including means for connecting all of said first coils to said first energization circuit and for sequentially and at spaced intervals connecting first one and then another of said first coils to said second energization circuit, said commutator also including means for connecting first one and then another of said second coils to said third energization circuit, the particular second coil connected at any given time being the coil which is associated with the same valve as the particular first coil then connected to said second energization circuit, a cam member rotated by said timer for opening said circuit interrupter a predetermined period of time each time one of said first coils is connected to said second energization circuit, and a second cam member rotated by said timer for closing said circuit closing means for a predetermined period of time each time one of said second coils is connected to said third energization circuit, the length of the period said circuit closing means remains closed and the length of the period said circuit interrupter remains open being substantially the same.

12. The combination comprising a first electrical element, a second electrical element, an energization circuit, a first connecting circuit, a second connecting circuit having a cam-operated switch therein biased to its closed position, a third connecting circuit having a cam-operated switch therein biased to its open position, cycling means for connecting said first electrical element to said energization circuit through said first connecting circuit during one stage of a cycle of operation, for connecting said first electrical element to said energization circuit during a second stage of a cycle of operation, and for connecting said second electrical element to said energization circuit through said third connecting circuit during said second stage of a cycle of operation, and a timer having means for actuating said cam-operated switches to their open and closed positions respectively for a period of time adjustable duration.

13. The combination comprising a first electrical element, a second electrical element, a first energizing circuit, a second energizing circuit having a switch therein biased to its closed position, a third energizing circuit having a switch therein biased to its open position, cycling means for connecting said first energizing circuit to said first electrical element during one stage of a cycle of operation and for connecting said second energizing circuit to said first electrical element in place of said first energizing circuit during a second stage of a cycle of operation and for connecting said third energization circuit to said second electrical element during said second stage, and timer means for opening said first switch and closing said second switch for a predetermined period of time during said second stage of a cycle operation.

JAMES H. BOOTH.

REFERENCES CITED

The following references are of record in the file of this patent:

UNITED STATES PATENTS

| Number | Name | Date |
|---|---|---|
| Re. 18,194 | French | Sept. 15, 1931 |
| 719,325 | Gray | Jan. 27, 1903 |
| 1,059,604 | Gaff | Apr. 22, 1913 |
| 1,177,761 | Clemmer | Apr. 4, 1916 |
| 1,197,262 | Butler | Sept. 5, 1916 |
| 1,288,439 | Pattinson | Dec. 17, 1918 |
| 1,575,008 | Rubin | Mar. 2, 1926 |
| 2,151,519 | Kubelus | Mar. 21, 1939 |
| 2,226,856 | Gunter | Dec. 31, 1940 |
| 2,340,075 | Parsons | Jan. 25, 1944 |
| 2,349,864 | Hansen | May 30, 1944 |